(12) United States Patent
Jegebris et al.

(10) Patent No.: US 10,525,810 B2
(45) Date of Patent: Jan. 7, 2020

(54) ELECTRIC DRIVE UNIT

(71) Applicant: e-AAM Driveline Systems AB, Trollhättan (SE)

(72) Inventors: Thomas Jegebris, Uddevalla (SE); Mathias Petersson, Trollhättan (SE); Miguel Garcia Cabrera, Trollhättan (SE); Oscar Nyberg, Uddevalla (SE); Gabriel Trönnberg, Trollhattan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 61 days.

(21) Appl. No.: 15/893,786

(22) Filed: Feb. 12, 2018

(65) Prior Publication Data
US 2018/0236861 A1 Aug. 23, 2018

Related U.S. Application Data

(60) Provisional application No. 62/462,449, filed on Feb. 23, 2017.

(51) Int. Cl.
| | |
|---|---|
| *B60K 1/00* | (2006.01) |
| *F16H 3/46* | (2006.01) |
| *F16H 3/72* | (2006.01) |
| *B60K 17/08* | (2006.01) |
| *B60K 17/16* | (2006.01) |
| *F16H 48/08* | (2006.01) |
| *B60K 6/365* | (2007.10) |

(52) U.S. Cl.
CPC .............. *B60K 1/00* (2013.01); *B60K 17/08* (2013.01); *B60K 17/16* (2013.01); *F16H 3/46* (2013.01); *F16H 3/72* (2013.01); *B60K 6/365* (2013.01); *F16H 48/08* (2013.01); *F16H 2200/0021* (2013.01); *F16H 2200/0034* (2013.01); *F16H 2200/2007* (2013.01); *Y10S 903/911* (2013.01)

(58) Field of Classification Search
None
See application file for complete search history.

(56) References Cited

U.S. PATENT DOCUMENTS

| | | | |
|---|---|---|---|
| 7,395,888 B2 * | 7/2008 | Yamamoto | B60K 6/42 180/65.29 |
| 7,410,440 B2 * | 8/2008 | Garcia | B60B 35/08 29/401.1 |

(Continued)

*Primary Examiner* — Dirk Wright
(74) *Attorney, Agent, or Firm* — Harness, Dickey & Pierce, P.L.C.

(57) ABSTRACT

An electric drive unit with a housing, a motor coupled to the housing and having a motor shaft, a differential assembly, a pair of output shafts, and a transmission that transmits rotary power between the motor shaft and the differential input member. The differential assembly and the transmission are received in the housing. The differential assembly has a differential input member and a differential a pair of differential output members that are rotatably coupled to the output shafts. The transmission has a transmission output member that is coupled to the differential input member for rotation therewith. An optional mechanical input assembly can be housed in the housing and can have a ring gear, which can be coupled to the differential input member for rotation therewith, and an input pinon that can be meshingly engaged to the ring gear.

25 Claims, 8 Drawing Sheets

(56) References Cited

U.S. PATENT DOCUMENTS

| | | | | |
|---|---|---|---|---|
| 7,549,940 | B2* | 6/2009 | Kira | B60K 6/36 |
| | | | | 475/204 |
| 7,762,366 | B2* | 7/2010 | Janson | B60K 6/365 |
| | | | | 180/65.6 |
| 8,272,989 | B2* | 9/2012 | Baasch | B60K 17/165 |
| | | | | 475/150 |
| 8,567,540 | B2* | 10/2013 | Janson | B60K 6/26 |
| | | | | 180/65.22 |
| 8,727,928 | B2* | 5/2014 | Harashima | B60K 1/00 |
| | | | | 180/65.31 |
| 8,992,367 | B2* | 3/2015 | Kalmbach | F16H 3/44 |
| | | | | 475/150 |
| 8,998,764 | B2 | 4/2015 | Sten et al. | |
| 8,998,765 | B2* | 4/2015 | Sten | F16H 48/36 |
| | | | | 475/205 |
| 9,062,744 | B2 | 6/2015 | Valente et al. | |
| 9,500,267 | B2* | 11/2016 | Hederstad | B60K 17/165 |
| 9,625,021 | B2* | 4/2017 | Knoblauch | B60L 15/2054 |
| 9,637,022 | B2* | 5/2017 | Gavling | B60L 15/025 |
| 9,707,834 | B2* | 7/2017 | Lee | F16H 3/663 |
| 9,719,585 | B2* | 8/2017 | Sten | F16H 48/36 |
| 2005/0167228 | A1* | 8/2005 | Baxter, Jr. | F16H 48/08 |
| | | | | 192/49 |
| 2013/0274051 | A1* | 10/2013 | Kalmbach | F16H 57/031 |
| | | | | 475/150 |
| 2016/0138659 | A1 | 5/2016 | Strandberg | |
| 2016/0138695 | A1 | 5/2016 | Tronnberg | |
| 2016/0272067 | A1 | 9/2016 | Tronnberg et al. | |
| 2016/0318419 | A1 | 11/2016 | Gavling et al. | |
| 2018/0304917 | A1* | 10/2018 | Michelis | B62D 5/0472 |

* cited by examiner

ELECTRIC DRIVE UNIT

FIELD

The present disclosure relates to an electric drive unit.

BACKGROUND

Electric drive units are increasingly employed in automotive vehicles to reduce vehicle emissions and to provide capabilities for improved vehicle dynamics. One disadvantage of the known configurations for electric drive modules concerns their size. In this regard, a relatively large electric motor and transmission are typically required and consequently, it can be difficult to package some of the known configurations into a particular vehicle. Moreover, the packaging of the electric drive unit into a vehicle can be significantly more complex when the electric drive unit is configured to provide auxiliary power to an axle that is normally driven by power produced by an internal combustion engine.

SUMMARY

This section provides a general summary of the disclosure, and is not a comprehensive disclosure of its full scope or all of its features.

In one form, the teachings of the present disclosure provide an electric drive unit that includes a housing, a motor coupled to the housing and having a motor shaft, a differential assembly received in the housing, first and second output shafts, and a two-speed transmission received in the housing. The differential assembly has a differential input member and first and second differential output members. The first and second output shafts are rotatably coupled to the first and second differential output members, respectively. The two-speed transmission has a first planetary stage, a second planetary stage and a transmission output member. The first planetary stage has a first sun gear, which is coupled to the motor shaft for rotation therewith, a first internal gear, which is non-rotatably coupled to the housing, a first planet carrier, and a plurality of first planet gear sets that are journally supported on the first planet carrier and meshingly engaged with the first sun gear and the first internal gear. The second planetary stage has a second sun gear, a second internal gear, a second planet carrier and a plurality of second planet gear sets. The second sun gear is coupled to the first planet carrier for rotation therewith. The second internal gear is non-rotatably coupled to the housing. The plurality of second planet gears are journally supported on the second planet carrier and meshingly engaged with the second sun gear and the second internal gear. The transmission output member is non-rotatably but slidably coupled to the differential input member for movement along a rotational axis of the differential input member between a first position, in which the transmission output member is non-rotatably coupled to the first planet carrier and rotationally decoupled from the second planet carrier, and a second position in which the transmission output member is non-rotatably coupled to the second planet carrier and rotationally decoupled from the first planet carrier.

In another form, the teachings of the present disclosure provide an electric drive unit that includes a housing, a motor coupled to the housing and having a motor shaft, a differential assembly, first and second output shafts, a transmission, which transmits rotary power between the motor shaft and the differential input member, and a mechanical input assembly. The differential assembly, the transmission and the mechanical input assembly are received in the housing. The differential assembly has a differential input member and first and second differential output members. The first and second output shafts are rotatably coupled to the first and second differential output members, respectively. The transmission has a transmission output member that is coupled to the differential input member for rotation therewith. The mechanical input assembly has a ring gear, which is coupled to the differential input member for rotation therewith, an input pinon that is meshingly engaged to the ring gear, an input flange and an auxiliary transmission that transmits rotary power between the input flange and the input pinion.

In still another form, the present teachings provide an electric drive unit having a housing, a motor coupled to the housing and having a motor shaft, a differential assembly, first and second output shafts, a two-speed transmission and a mechanical input assembly. The differential assembly, the two-speed transmission and the mechanical input assembly are received in the housing. The differential assembly has a differential input member and first and second differential output members. The first output shaft is coupled to the first differential output member for rotation therewith, while the second output shaft is coupled to the second differential output member for rotation therewith. The two-speed transmission has a first planetary stage, a second planetary stage and a transmission output member. The first planetary stage has a first sun gear, which is coupled to the motor shaft for rotation therewith, a first internal gear, which is non-rotatably coupled to the housing, a first planet carrier, and a plurality of first planet gear sets that are journally supported on the first planet carrier and meshingly engaged with the first sun gear and the first internal gear. The second planetary stage has a second sun gear, a second internal gear, a second planet carrier and a plurality of second planet gear sets. The second sun gear is coupled to the first planet carrier for rotation therewith. The second internal gear is non-rotatably coupled to the housing. The plurality of second planet gears are journally supported on the second planet carrier and meshingly engaged with the second sun gear and the second internal gear. The transmission output member is non-rotatably but slidably coupled to the differential input member for movement along a rotational axis of the differential input member between a first position, in which the transmission output member is non-rotatably coupled to the first planet carrier and rotationally decoupled from the second planet carrier, and a second position in which the transmission output member is non-rotatably coupled to the second planet carrier and rotationally decoupled from the first planet carrier. The mechanical input assembly has an input flange, a ring gear, an input pinion, and an auxiliary transmission that transmits rotary power between the input flange and the input pinion. The ring gear is coupled to the differential input member for rotation therewith. The input pinon is meshingly engaged to the ring gear. The ring gear and the input pinion are spiral bevel gears.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
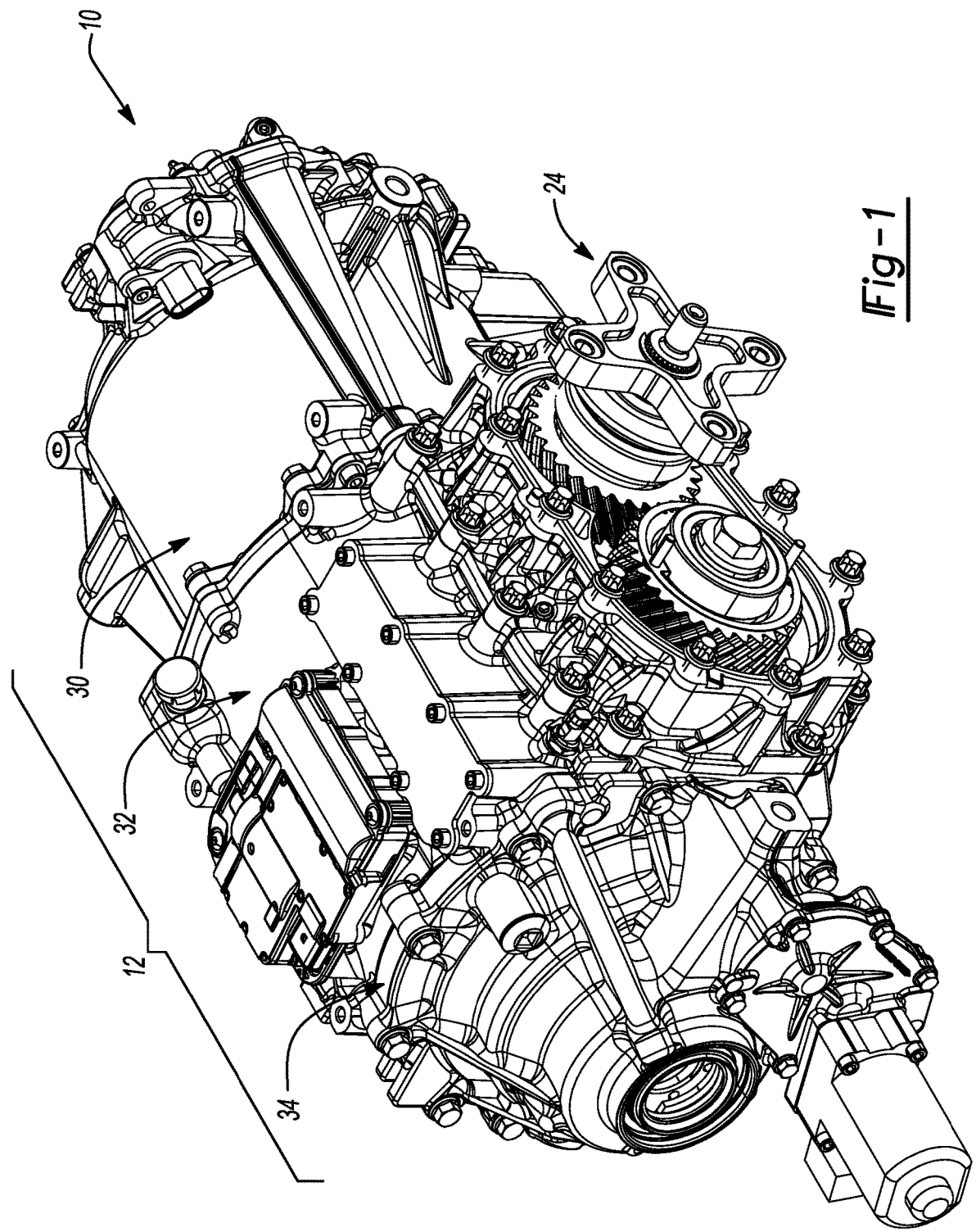
FIG. 1 is a perspective view of an exemplary electric drive unit constructed in accordance with the teachings of the present disclosure.
Figure 2:
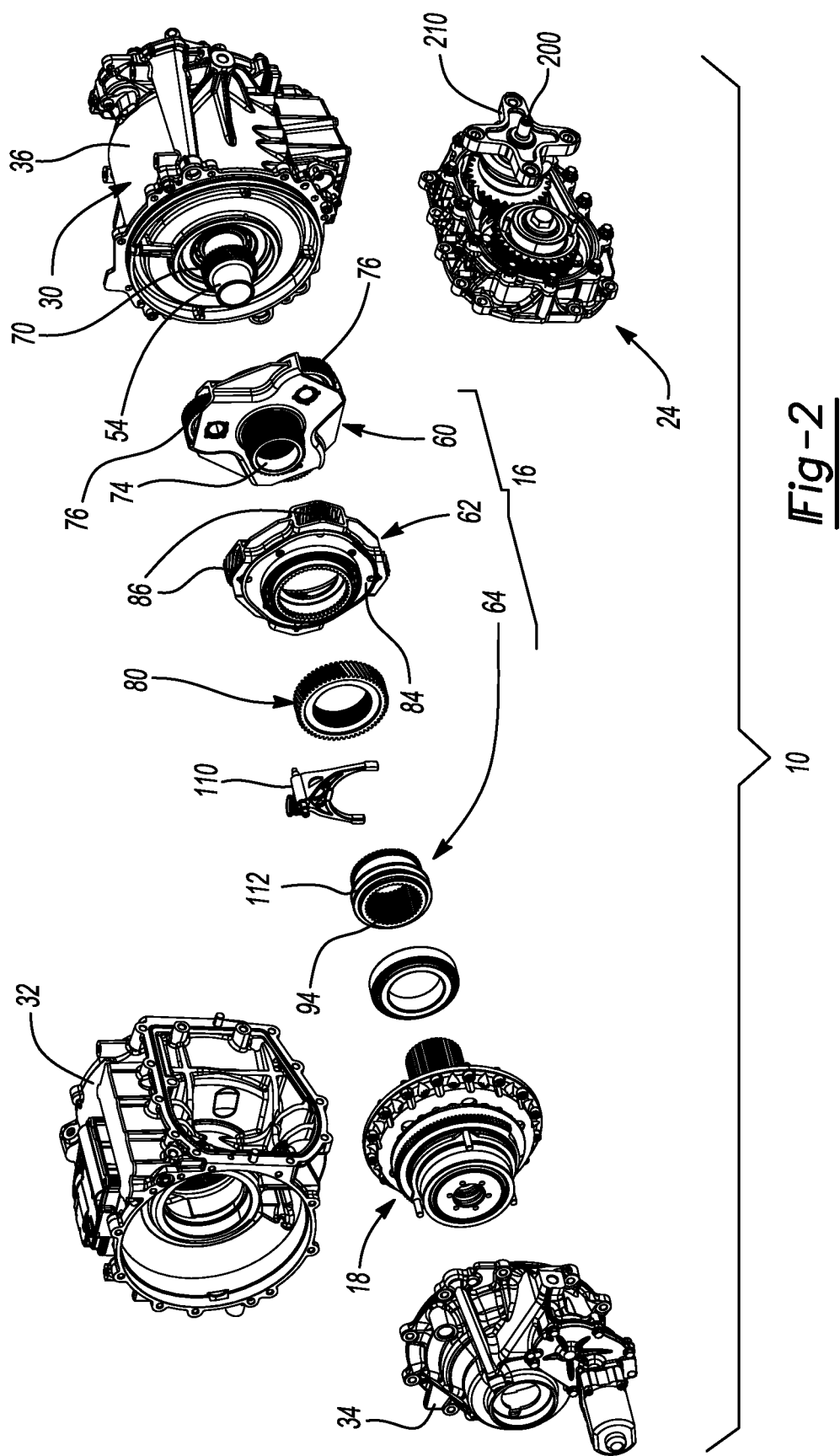
FIG. 2 is an exploded perspective view of the electric drive unit of FIG. 1.
Figure 3:
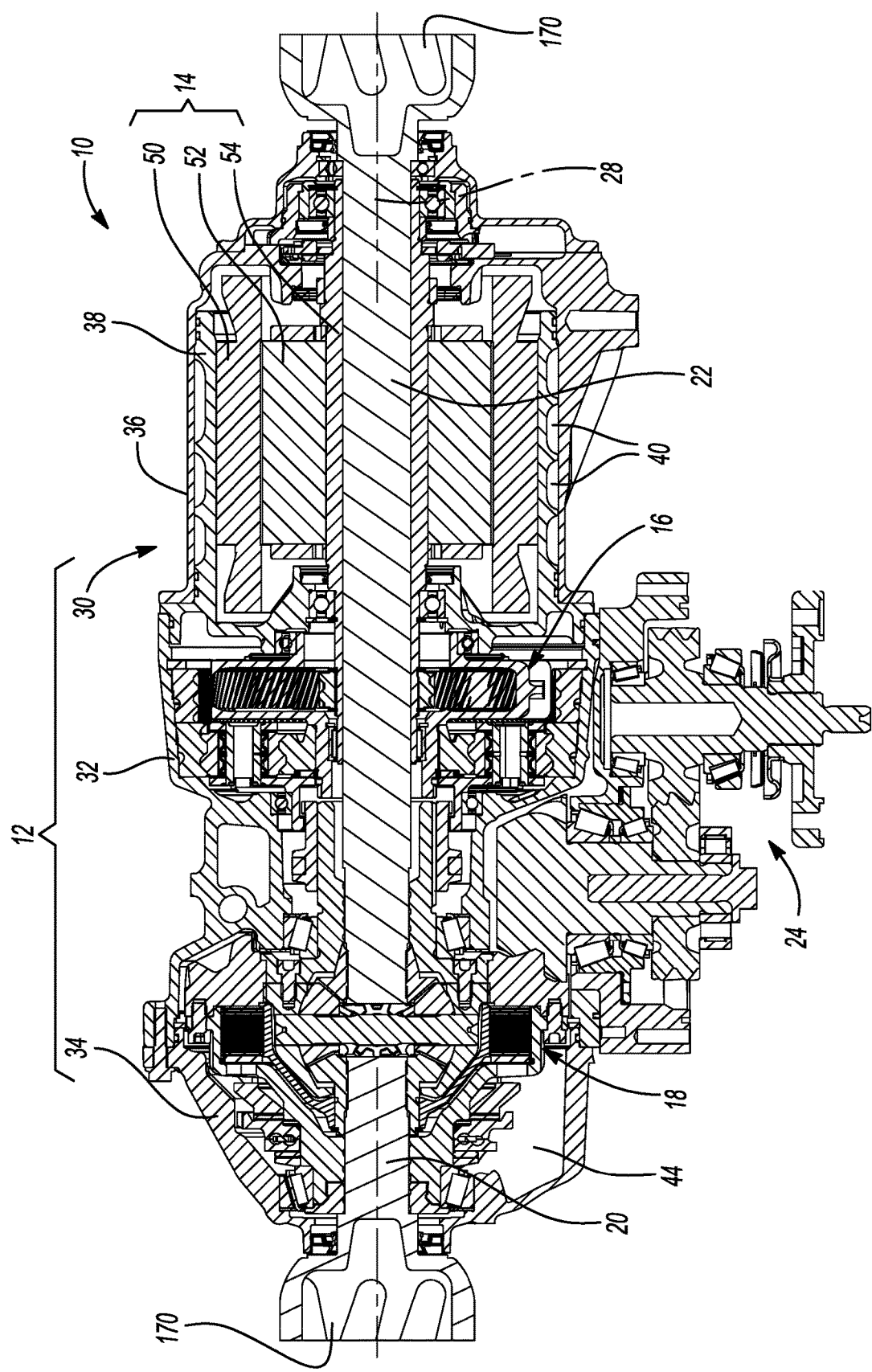
FIG. 3 is a cross-sectional view of the electric drive unit of FIG. 1.

With reference to FIGS. 1 through 3, a two-speed electric drive unit (EDU) constructed in accordance with the teachings of the present disclosure is generally indicated by reference numeral 10. The EDU 10 can include a housing assembly 12, an electric motor 14, a two-speed transmission 16, a differential assembly 18 and first and second output shafts 20 and 22, respectively. In the particular example provided, the EDU 10 further includes a mechanical input assembly 24 that is configured to receive rotary power from an internal combustion engine (not shown) via a propshaft (not shown).

In the example provided, the housing assembly 12 defines a first rotary axis 28 and comprises a motor housing assembly 30, a main housing 32 and a cover 34. The motor housing assembly 30 includes an exterior motor housing 36 and an interior motor housing 38 that is received into the exterior motor housing 36 and configured to receive the electric motor 14 therein. The exterior and interior motor housings 36 and 38 can cooperate to define one or more helically-shaped coolant channels 40 through which a cooling fluid can be circulated to remove heat produced during the operation of the electric motor 14. The main housing 32 is disposed laterally between and fixedly coupled to the interior motor housing 38 and the cover 34.

The main housing 32 defines an internal cavity 44 into which the two-speed transmission 16, the differential assembly 18 and the mechanical input assembly 24 are received. The cover 34 is fixedly coupled to the main housing 32 to close a portion of the internal cavity 44 in which the differential assembly 18 is received.

Figure 4:
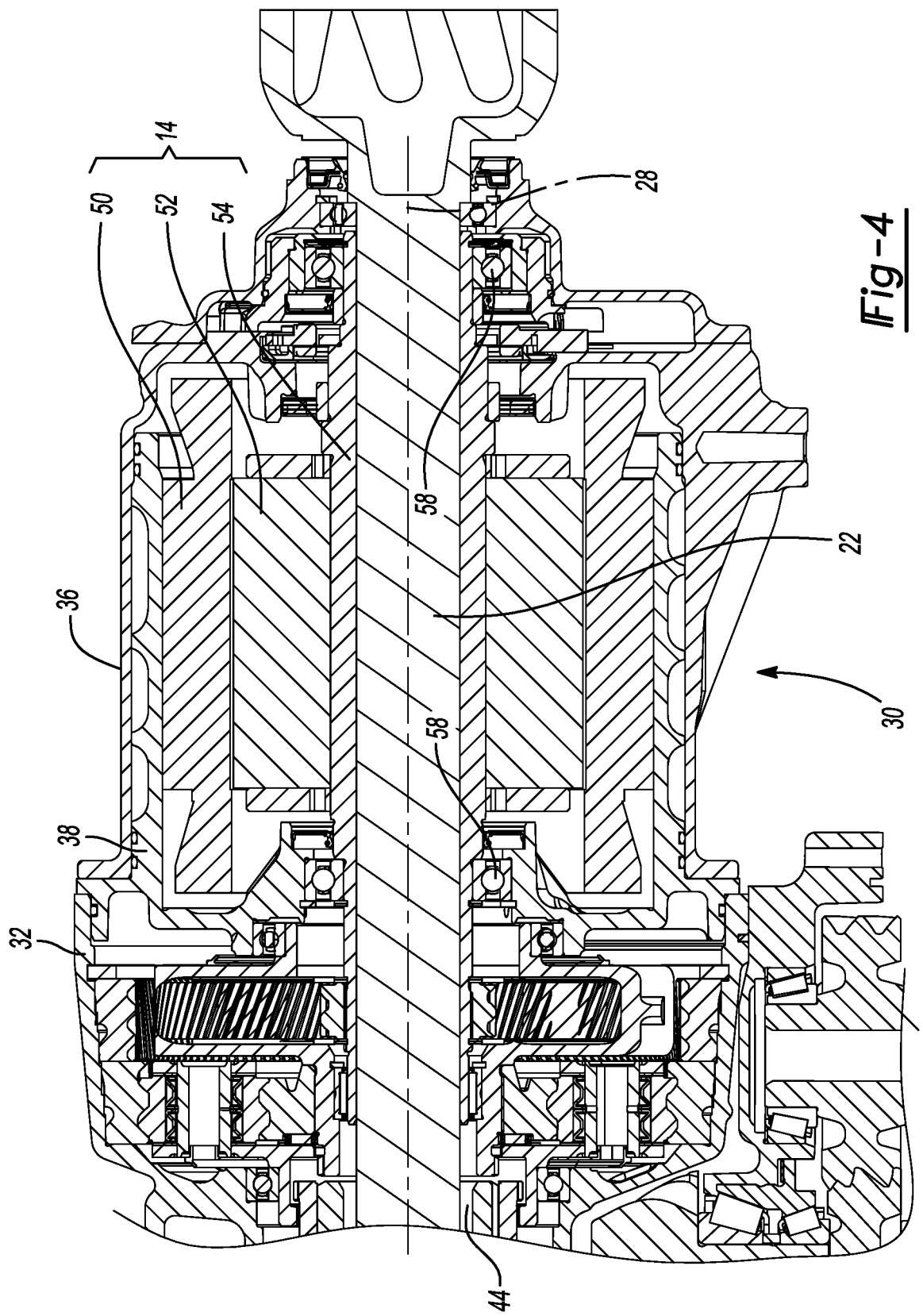
FIG. 4 is an enlarged portion of FIG. 3 illustrating an electric motor in more detail.

With reference to FIG. 4, the electric motor 14 can comprise a stator 50, which is fixedly coupled to the interior motor housing 38, a rotor 52, which is received in the stator 50 and rotatable about the first rotary axis 28, and a motor shaft 54 that is fixedly coupled to the rotor 52 for rotation therewith. In the example provided, the motor shaft 54 is a hollow structure that is supported for rotation relative to the motor housing assembly 30 via a pair of bearings 58. The motor shaft 54 can be hollow and can extend into the internal cavity 44 in the main housing 32.

Figure 5:
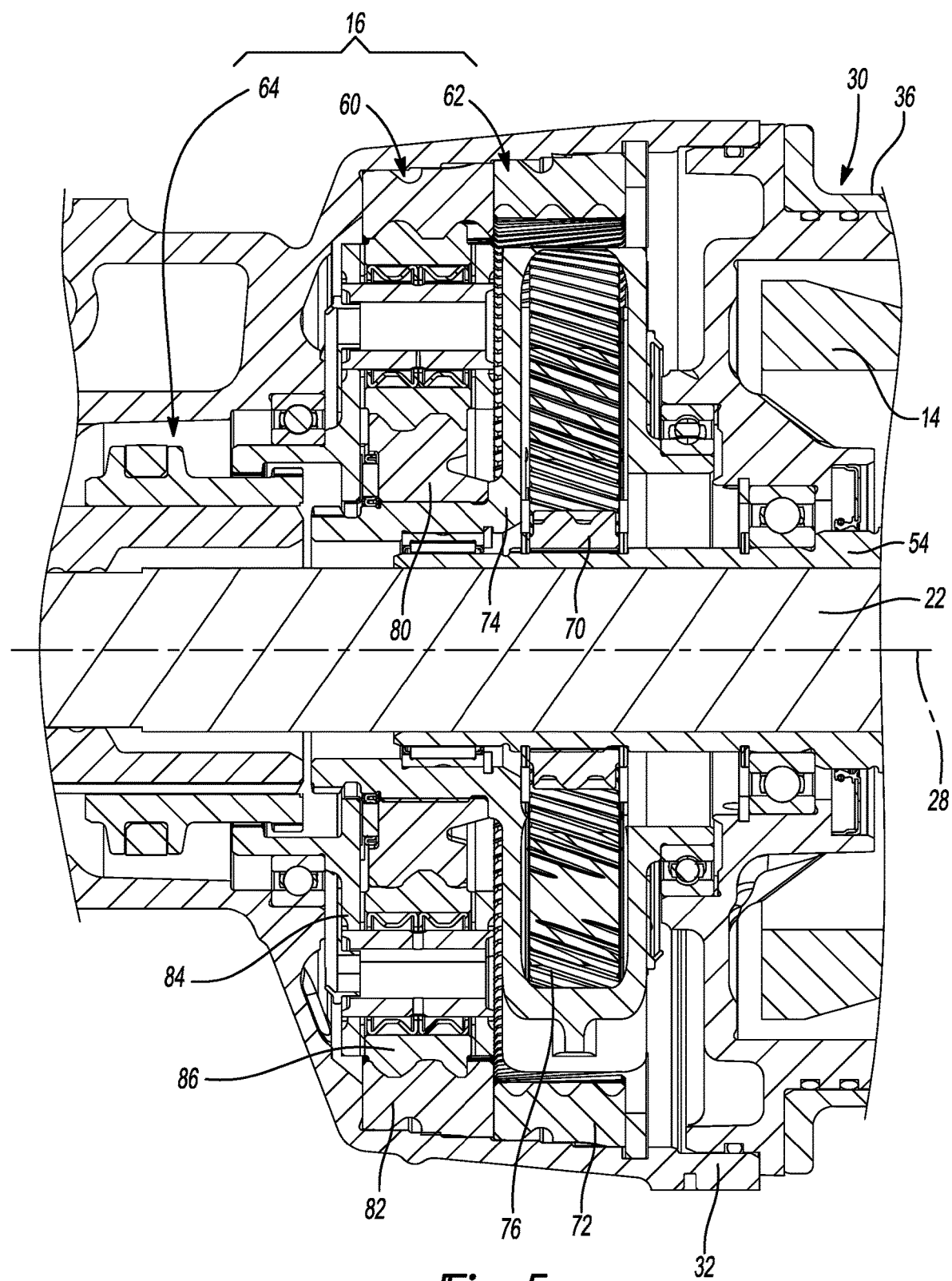
FIG. 5 is an enlarged portion of FIG. 3 illustrating a two-speed planetary transmission in more detail.

With reference to FIG. 5, the two-speed transmission 16 can comprise a first planetary stage 60, a second planetary stage 62 and a transmission output 64. The first planetary stage 60 can include a first sun gear 70, which can be formed on or rotatably coupled to the motor shaft 54 of the electric motor 14, a first internal gear 72, which can be non-rotatably coupled to the main housing 32, a first planet carrier 74 and a plurality of first planet gear sets 76. The first planet carrier 74 can include a first carrier body and a plurality of pins that are fixedly coupled to the first carrier body. Each of the first planet gear sets 76 are in meshing engagement with the first sun gear 70 and the first internal gear 72 and can have one or more planet gears. In the example provided, each of the first planet gear sets 76 has a single planet gear that meshingly engages both the first sun gear 70 and the first internal gear 72. It will be appreciated, however, that each of the first planet gear sets 76 could include two or more planet gears, with a first one of the planet gears being in meshing engagement with the first sun gear 70 and a second one of the planet gears being in meshing engagement with the first internal gear 72 and the first one of the planet gears. Each of the planet gears of the first set of planet gears 76 is journally supported by an associated one of the pins of the first planet carrier 74.

The second planetary stage 62 can include a second sun gear 80, which can be formed on or rotatably coupled to the first carrier body of the first planet carrier 74, a second internal gear 82, which can be non-rotatably coupled to the main housing 32, a second planet carrier 84 and a plurality of second planet gear sets 86.

The second planet carrier 84 can include a second carrier body and a plurality of pins that are fixedly coupled to the second carrier body. Each of the second planet gear sets 86 is in meshing engagement with the second sun gear 80 and the second internal gear 82 and can have one or more planet gears. In the example provided, each of the second planet gear sets 86 has a single planet gear that meshingly engages both the second sun gear 80 and the second internal gear 82. It will be appreciated, however, that each of the second planet gear sets 86 could include two or more planet gears, with a first one of the planet gears being in meshing engagement with the second sun gear 80 and another one of the planet gears, and a second one of the planet gears being in meshing engagement with the second internal gear 82 and another one of the planet gears. Each of the planet gears of the second planet gear sets 86 is journally supported by an associated one of the pins of the second planet carrier 84.

Figure 6:
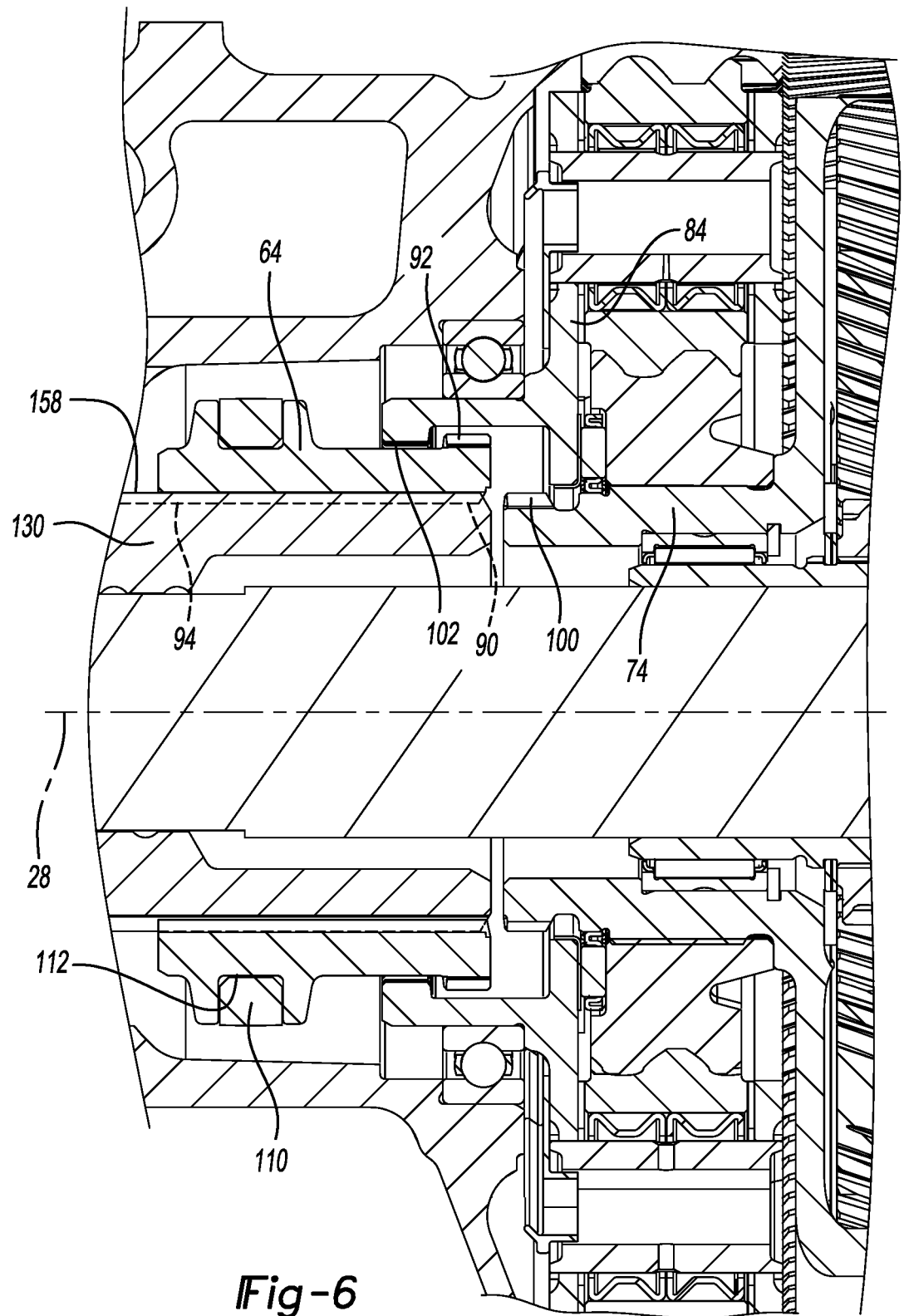
FIG. 6 is an enlarged portion of FIG. 5 illustrating a transmission output in more detail.

With reference to FIG. 6, the transmission output 64 is a sleeve-like structure having a first set of teeth 90, a second set of teeth 92 and a third set of teeth 94. The first set of teeth 90 comprise internal teeth that are configured to engage a mating set of external teeth 100 formed on the first carrier body of the first planet carrier 74. The second set of teeth 92 comprise external teeth that are configured to engages a mating set of internal teeth 102 formed on the second carrier body of the second planet carrier 84. In the particular example provided, the second set of teeth 92 is disposed radially outwardly of the first set of teeth 90 without being axially offset therefrom, while the mating set of internal teeth 102 is offset along the first rotary axis 28 from the mating set of external teeth 100. Configuration in this manner permits the transmission output 64 to be moved along the first rotary axis 28 between a first position, in which the first set of teeth 90 are engaged to the mating external teeth 100 on the first carrier body and the second set of teeth 92 are disengaged from the internal teeth 102 on the second carrier body, a second position, in which the first set of teeth 90 are disengaged from the mating external teeth 100 on the first carrier body and the second set of teeth 92 are engaged to the internal teeth 102 on the second carrier body, and a third position intermediate the first and second positions in which the first set of teeth 90 are disengaged from the mating external teeth 100 on the first carrier body and the second set of teeth 92 are disengaged from the internal teeth 102 on the second carrier body. The third set of teeth 94 can comprise internal teeth.

Any desired means can be employed to selectively translate the transmission output 64 between the first, second and third positions. In the particular example provided, an actuator having a clutch fork 110 is employed to selectively translate the transmission output 64. The clutch fork 110 can comprise a pair of arms that can be received in a groove 112 formed in an outside diametrical surface of the transmission output 64.

Figure 7:
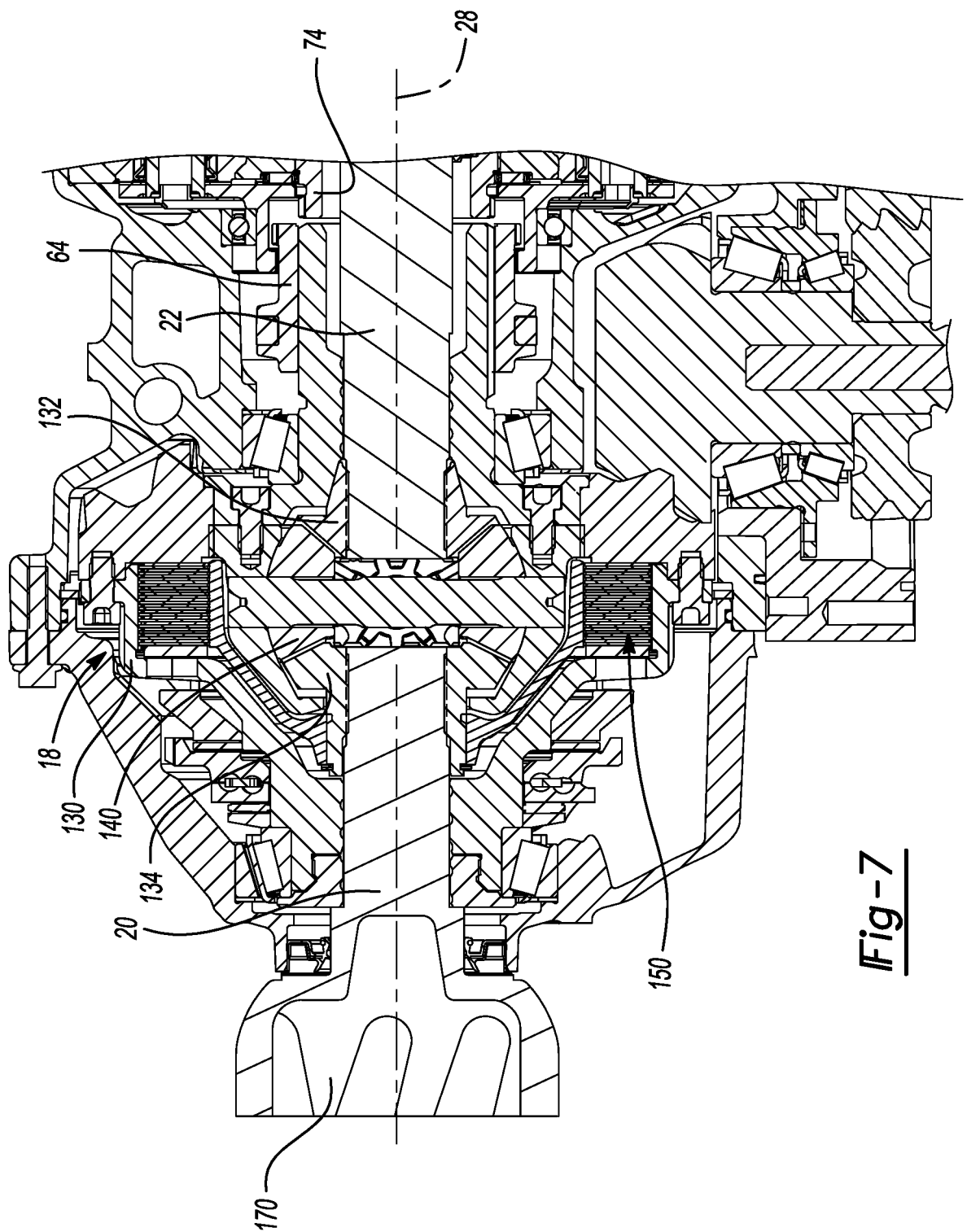
FIG. 7 is an enlarged portion of FIG. 3 illustrating a differential assembly in more detail.

With reference to FIG. 7, the differential assembly 18 can include a differential input 130 and first and second differential outputs 132 and 134, respectively. The differential assembly 18 can be any type of mechanism that can permit torque transmission between the differential input 130 and the first and second differential outputs 132 and 134, while being capable of permitting speed differentiation between the first and second differential outputs 132 and 134. The differential assembly 18 of the present example comprises a differential gearset, but it will be appreciated that the differential assembly could comprise one or more friction clutches. In the particular example provided, the differential input 130 is a differential case and the differential gearset is a bevel gearset that comprises a cross-pin (not shown), which is coupled to the differential case for rotation therewith in an orientation that is perpendicular to the first axis, a plurality of differential pinions 140, which are rotatably mounted onto the cross-pin, and first and second side gears (i.e., the first and second differential outputs 132 and 134, respectively) that are each in meshing engagement with the differential pinions 140. The differential assembly 18 can be configured as an open differential, in which speed differentiation between the first and second differential outputs 132 and 134 is not limited. Alternatively, the differential assembly 18 can be a type of locking or limited slip differential assembly as is shown. In this example, a clutch pack 150 is disposed between the differential input 130 (differential case) and the first differential output 132. The clutch pack 150 comprises a first set of clutch plates, which are axially slidably but non-rotatably coupled to the differential input 130, and a second set of clutch plates that are interleaved with the first set of clutch plates and axially slidably but non-rotatably coupled to the first output shaft 22. Because the first differential output 132 is fixedly and non-rotatably coupled to the first output shaft 22, the first set of clutch plates are also axially slidably but non-rotatably coupled to the first differential output 132. Any type of linear motor, such as a hydraulic cylinder, a ball-ramp actuator or any other type of mechanical actuator, can be employed to compress the clutch pack to thereby frictionally couple the first differential output 132 to the differential input 130 to a desired extent. The differential assembly 18 that is depicted in this example can be operated in a first mode and a second mode. In the first mode, the clutch pack 150 is not compressed and as such, does not rotationally couple the differential input 130 to the first output shaft 22/first differential output 132 and as such, the differential assembly 18 operates as an open differential (i.e., the differential assembly 18 does not limit speed differentiation between the first and second differential outputs 132 and 134). In the second mode, the clutch pack 150 is fully compressed and as such, can transmit rotary power from the differential input 130 to the first output shaft 22/first differential output 132 to cause the first output shaft 22/first differential output 132 to co-rotate with the differential input 130. In this condition, the differential assembly 18 inhibits speed differentiation between the first and second differential output members 132 and 134.

With reference to FIGS. 2 through 7, the transmission output 64 of the two-speed transmission 16 is axially slidably but non-rotatably coupled to the differential input 130. In the example provided, the third set of teeth 94 on the transmission output 64 comprise internal teeth that are matingly engaged to external teeth 158 formed on a sleeve-like portion the differential input 130 that is disposed axially along the first rotary axis 28 between the second differential output 134 and the first planet carrier 74. Accordingly, it will be appreciated that the transmission output 64 is coupled to the differential input 130 for common rotation about the first rotary axis 28 regardless of whether the transmission output 64 is in its first, second or third position.

The first output shaft 20 can be coupled to the first differential output 132 for rotation therewith, while the second output shaft 22 can be received through the motor shaft 54 of the electric motor 14 and coupled to the second differential output—for rotation therewith. In the example provided, each of the first and second output shafts 20 and 22 is a stub shaft having an outer bearing race 170 of a constant velocity joint coupled thereto.

Figure 8:
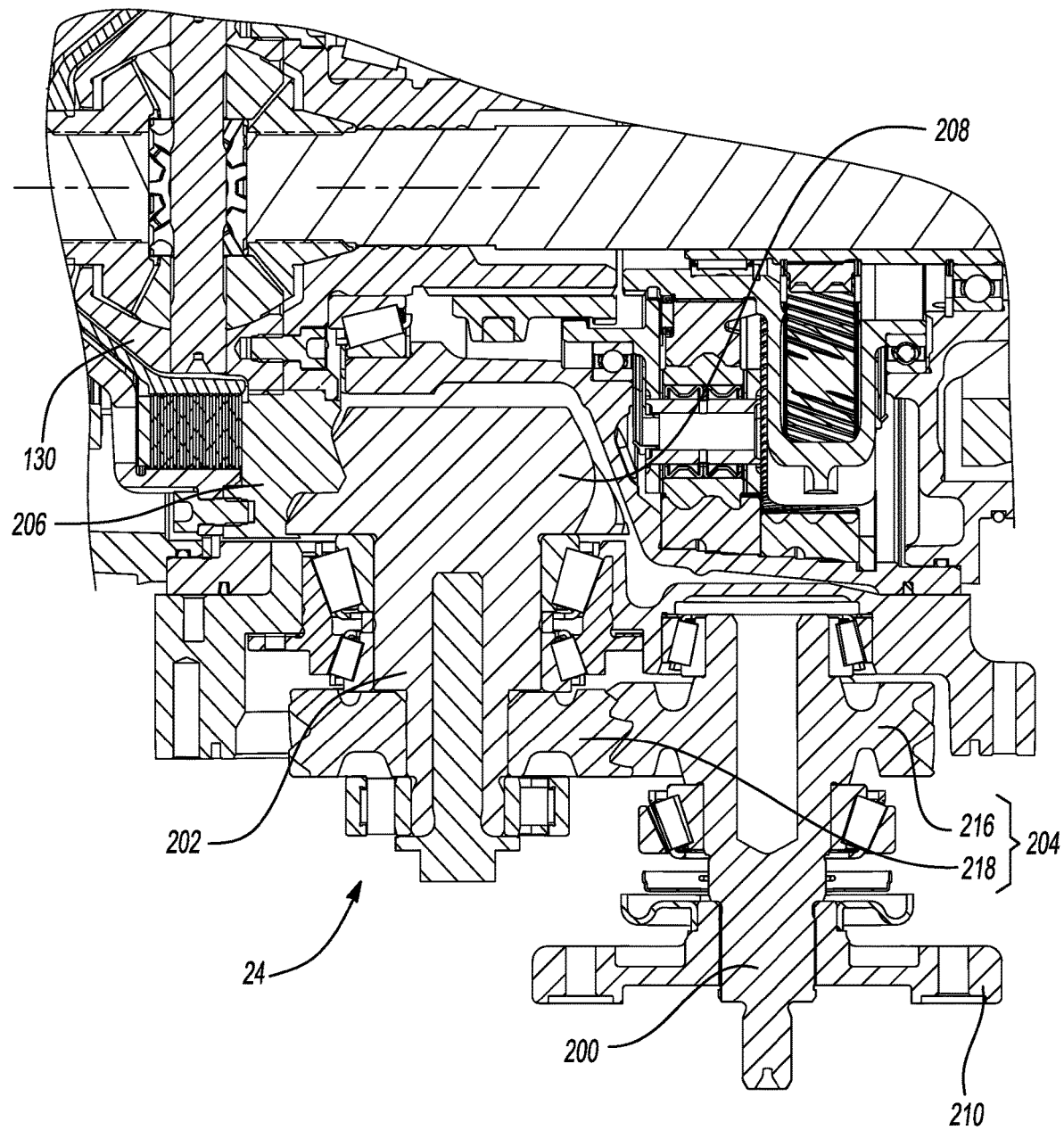
FIG. 8 is a sectional view of the electric drive unit of FIG. 1 illustrating a mechanical input assembly in more detail.

With reference to FIG. 8, the mechanical input assembly 24 can be configured to receive rotary power from a rotating shaft that is oriented transverse or perpendicular to the first rotary axis 28 to drive the differential input 130. In the particular example provided, the mechanical input assembly 24 is configured to drive the differential input 130 in a manner that is offset along the first rotary axis 28 from the rotary axis about which rotary power is input to the mechanical input assembly 24. It will be appreciated that the offset along the first rotary axis 28 that is depicted can be greater than or less than that which is shown in the drawings. In the example provided, the mechanical input assembly 24 includes a first shaft 200, a second shaft 202, a transmission 204 for transmitting rotary power between the first shaft 200 and the second shaft 202, and output ring gear 206 and an output pinion gear 208. The first shaft 200 is configured to be coupled to a propshaft (not shown) to receive rotary power therefrom. In the example provided, a flange 210 is mounted to the first shaft 200 and is configured to participate in the mechanical connection of the first shaft 200 to the propshaft. The second shaft 202 can be offset from the first shaft 200 in one or two directions that are perpendicular to the first rotary axis 28. The transmission 204 can be configured to transmit rotary power between the first shaft 200 and the second shaft 202. In the particular example provided, the transmission 204 includes a first helical gear 216, which is coupled to the first shaft 200 for rotation therewith, and a second helical gear 218 that is coupled to the second shaft 202 for rotation therewith and meshingly engaged with the first helical gear 216. The output ring gear 206 is coupled to the differential input 130 for common rotation about the first rotary axis 28. In the example provided, the output ring gear 206 is a spiral bevel gear, such as a hypoid gear. The output pinion gear 208 can be coupled to the second shaft 202 for rotation therewith and can be meshingly engaged with the output ring gear 206.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive unit comprising:
a housing;
a motor coupled to the housing, the motor having a motor shaft;
a differential assembly received in the housing, the differential assembly having a differential input member and first and second differential output members;
a first output shaft coupled to the first differential output member for rotation therewith;
a second output shaft coupled to the second differential output member for rotation therewith; and
a two-speed transmission received in the housing, the two-speed transmission having a first planetary stage, a second planetary stage and a transmission output member, the first planetary stage having a first sun gear, which is coupled to the motor shaft for rotation therewith, a first internal gear, which is non-rotatably coupled to the housing, a first planet carrier, and a plurality of first planet gear sets that are journally supported on the first planet carrier and meshingly engaged with the first sun gear and the first internal gear, the second planetary stage having a second sun gear, a second internal gear, a second planet carrier and a plurality of second planet gear sets, the second sun gear being coupled to the first planet carrier for rotation therewith, the second internal gear being non-rotatably coupled to the housing, the plurality of second planet gears being journally supported on the second planet carrier and meshingly engaged with the second sun gear and the second internal gear, the transmission output member being non-rotatably but slidably coupled to the differential input member for movement along a rotational axis of the differential input member between a first position, in which the transmission output member is non-rotatably coupled to the first planet carrier and rotationally decoupled from the second planet carrier, and a second position in which the transmission output member is non-rotatably coupled to the second planet carrier and rotationally decoupled from the first planet carrier.

2. The electric drive unit of claim 1, wherein the differential assembly is operable in a first mode, in which the differential assembly does not limit speed differentiation between the first and second differential output members, and a second mode in which the differential assembly inhibits speed differentiation between the first and second differential output members.

3. The electric drive unit of claim 2, wherein the differential assembly comprises a clutch, wherein the clutch rotatably couples the first output shaft to the differential input member when the differential assembly is operated in the second mode.

4. The electric drive unit of claim 2, wherein the differential assembly includes a friction clutch that is selectively operable for rotatably coupling the differential input member to the first differential output member.

5. The electric drive unit of claim 1, further comprising a mechanical input assembly having a ring gear, which is coupled to the differential input member for rotation therewith, and an input pinon that is meshingly engaged to the ring gear.

6. The electric drive unit of claim 5, wherein the mechanical input assembly further comprises an input flange and an auxiliary transmission that transmits rotary power between the input flange and the input pinion.

7. The electric drive unit of claim 6, wherein the auxiliary transmission comprises a first gear, which is coupled to the input flange for rotation therewith, and a second gear that is meshed with the first gear and coupled to the input pinion for rotation therewith.

8. The electric drive unit of claim 5, wherein the ring gear and the input pinion are spiral bevel gears.

9. The electric drive unit of claim 8, wherein the ring gear and the input pinion are hypoid gears.

10. The electric drive unit of claim 1, wherein each of the first planet gear sets comprises a single planet gear that is meshingly engaged to both the first sun gear and the first internal gear.

11. The electric drive unit of claim 1, wherein each of the second planet gear sets comprises a single planet gear that is meshingly engaged to both the second sun gear and the second internal gear.

12. An electric drive unit comprising:
a housing;
a motor coupled to the housing, the motor having a motor shaft;
a differential assembly received in the housing, the differential assembly having a differential input member, a first and second differential output members, and a means for providing speed differentiation between the first and second differential outputs;
a first output shaft coupled to the first differential output for rotation therewith;
a second output shaft coupled to the second differential output for rotation therewith;
a transmission received in the housing and having a transmission output member that is coupled to the differential input member for rotation therewith, the transmission transmitting rotary power between the motor shaft and the differential input member; and
a mechanical input assembly having a ring gear, which is coupled to the differential input member for rotation therewith, an input pinon that is meshingly engaged to the ring gear, an input flange and an auxiliary transmission that transmits rotary power between the input flange and the input pinion;
wherein the ring gear and the input pinion are spiral bevel gears.

13. The electric drive unit of claim 12, wherein the differential assembly is a limited slip differential assembly that is operable in a first mode, in which the differential assembly does not limit speed differentiation between the first and second differential output members, and a second mode in which the differential assembly inhibits speed differentiation between the first and second differential output members.

14. The electric drive unit of claim 13, wherein the differential assembly comprises a clutch, wherein the clutch rotatably couples the first output shaft to the differential input member when the differential assembly is operated in the second mode.

15. The electric drive unit of claim 13, wherein the differential assembly includes a friction clutch that is selectively operable for rotatably coupling the differential input member to the first differential output member.

16. The electric drive unit of claim 12, wherein the auxiliary transmission comprises a first gear, which is coupled to the input flange for rotation therewith, and a second gear that is meshed with the first gear and coupled to the input pinion for rotation therewith.

17. The electric drive unit of claim 12, wherein the ring gear and the input pinion are hypoid gears.

18. An electric drive unit comprising:
a housing;
a motor coupled to the housing, the motor having a motor shaft;
a differential assembly received in the housing, the differential assembly having a differential input member and first and second differential output members;
a first output shaft coupled to the first differential output member for rotation therewith;
a second output shaft coupled to the second differential output member for rotation therewith;
a two-speed transmission received in the housing, the two-speed transmission having a first planetary stage, a second planetary stage and a transmission output member, the first planetary stage having a first sun gear, which is coupled to the motor shaft for rotation therewith, a first internal gear, which is non-rotatably coupled to the housing, a first planet carrier, and a plurality of first planet gear sets that are journally supported on the first planet carrier and meshingly engaged with the first sun gear and the first internal gear, the second planetary stage having a second sun gear, a second internal gear, a second planet carrier and a plurality of second planet gear sets, the second sun gear being coupled to the first planet carrier for rotation therewith, the second internal gear being non-rotatably coupled to the housing, the plurality of second planet gears being journally supported on the second planet carrier and meshingly engaged with the second sun gear and the second internal gear, the transmission output member being non-rotatably but slidably coupled to the differential input member for movement along a rotational axis of the differential input member between a first position, in which the transmission output member is non-rotatably coupled to the first planet carrier and rotationally decoupled from the second planet carrier, and a second position in which the transmission output member is non-rotatably coupled to the second planet carrier and rotationally decoupled from the first planet carrier; and a mechanical input assembly having an input flange, a ring gear, an input pinion, and an auxiliary transmission that transmits rotary power between the input flange and the input pinion, the ring gear being coupled to the differential input member for rotation therewith, the input pinon being meshingly engaged to the ring gear and wherein the ring gear and the input pinion are spiral bevel gears.

19. The electric drive unit of claim 18, wherein each of the first planet gear sets comprises a single planet gear that is meshingly engaged to both the first sun gear and the first internal gear.

20. The electric drive unit of claim 18, wherein each of the second planet gear sets comprises a single planet gear that is meshingly engaged to both the second sun gear and the second internal gear.

21. The electric drive unit of claim 18, wherein the auxiliary transmission comprises a first gear, which is coupled to the input flange for rotation therewith, and a second gear that is meshed with the first gear and coupled to the input pinion for rotation therewith.

22. The electric drive unit of claim 18, wherein the ring gear and the input pinion are hypoid gears.

23. The electric drive unit of claim 18, wherein the differential assembly is a limited slip differential assembly that is operable in a first mode, in which the differential assembly does not limit speed differentiation between the first and second differential output members, and a second mode in which the differential assembly inhibits speed differentiation between the first and second differential output members.

24. The electric drive unit of claim 23, wherein the differential assembly comprises a clutch, wherein the clutch rotatably couples the first output shaft to the differential input member when the differential assembly is operated in the second mode.

25. The electric drive unit of claim 18, wherein the differential assembly includes a friction clutch that is selectively operable for rotatably coupling the differential input member to the first differential output member.

* * * * *